(12) United States Patent
Zhang et al.

(10) Patent No.: US 12,309,623 B2
(45) Date of Patent: May 20, 2025

(54) METHOD FOR MANAGING PROPER OPERATION OF BASE STATION AND SYSTEM APPLYING THE METHOD

(71) Applicant: Nanning FuLian FuGui Precision Industrial Co., Ltd., Nanning (CN)

(72) Inventors: Yong-Jie Zhang, Shenzhen (CN); Yun-Feng Peng, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 364 days.

(21) Appl. No.: 17/826,638

(22) Filed: May 27, 2022

(65) Prior Publication Data

US 2023/0034061 A1 Feb. 2, 2023

(30) Foreign Application Priority Data

Jul. 29, 2021 (CN) .......................... 202110866591.0

(51) Int. Cl.
*H04W 24/06* (2009.01)
*H04B 7/04* (2017.01)
*H04W 16/18* (2009.01)
*H04W 16/28* (2009.01)
*H04W 24/02* (2009.01)

(52) U.S. Cl.
CPC ........... *H04W 24/06* (2013.01); *H04W 16/18* (2013.01)

(58) Field of Classification Search
None
See application file for complete search history.

(56) References Cited

U.S. PATENT DOCUMENTS

| | | | | |
|---|---|---|---|---|
| 8,185,124 | B2* | 5/2012 | Antic | H04W 16/06 455/452.2 |
| 8,553,729 | B2* | 10/2013 | Zhang | H04L 12/66 370/503 |
| 8,717,894 | B2* | 5/2014 | Zhang | H04W 72/04 370/336 |
| 2022/0416855 | A1* | 12/2022 | Oh | H04W 16/28 |

FOREIGN PATENT DOCUMENTS

| | | | |
|---|---|---|---|
| CN | 110891283 A | 3/2020 | |
| EP | 2892274 A1 * | 7/2015 | ........... H04W 24/04 |
| TW | 201344426 A | 11/2013 | |
| TW | 201639390 A | 11/2016 | |
| TW | I712273 B | 12/2020 | |
| WO | WO-2017219574 A1 * | 12/2017 | |
| WO | WO-2022237568 A1 * | 11/2022 | |
| WO | WO-2024021585 A1 * | 2/2024 | |

* cited by examiner

*Primary Examiner* — Pablo N Tran
(74) *Attorney, Agent, or Firm* — ScienBiziP, P.C.

(57) ABSTRACT

In a method for managing proper operation of a base station, a base station data model is established to realize remote monitoring integration of different base stations; a key performance indicator (KPI) and an alarm event uploaded by the base stations are collected through the base station data model; cells covered by the base stations are grouped, and a health management model for base station operation is built based on cell grouping, KPI, and the alarm event. KPIs and the alarm events uploaded by the base stations are received, and a health level of each base station is updated according to the base station health management model.

15 Claims, 5 Drawing Sheets

METHOD FOR MANAGING PROPER OPERATION OF BASE STATION AND SYSTEM APPLYING THE METHOD

CROSS-REFERENCE TO RELATED APPLICATIONS

This application claims priority to Chinese Patent Application No. 202110866591.0 filed on Jul. 29, 2021, the contents of which are incorporated by reference herein.

FIELD

The subject matter herein generally relates to management for proper operation of base station, in particular to a management method for base station operation and system.

BACKGROUND

In the process of base station operation, there are the defects that users cannot intuitively and fully grasp the operating status of the base station, classification and hierarchical processing of key performance indicators KPI, and operating status classification are lacking. Predictive analysis of the operating status of the base station is absent, and upcoming performance and fault issues cannot be prepared and dealt with in advance.

BRIEF DESCRIPTION OF THE DRAWINGS

Implementations of the present technology will now be described, by way of example only, with reference to the attached figures, wherein.

DETAILED DESCRIPTION

Figure 1:
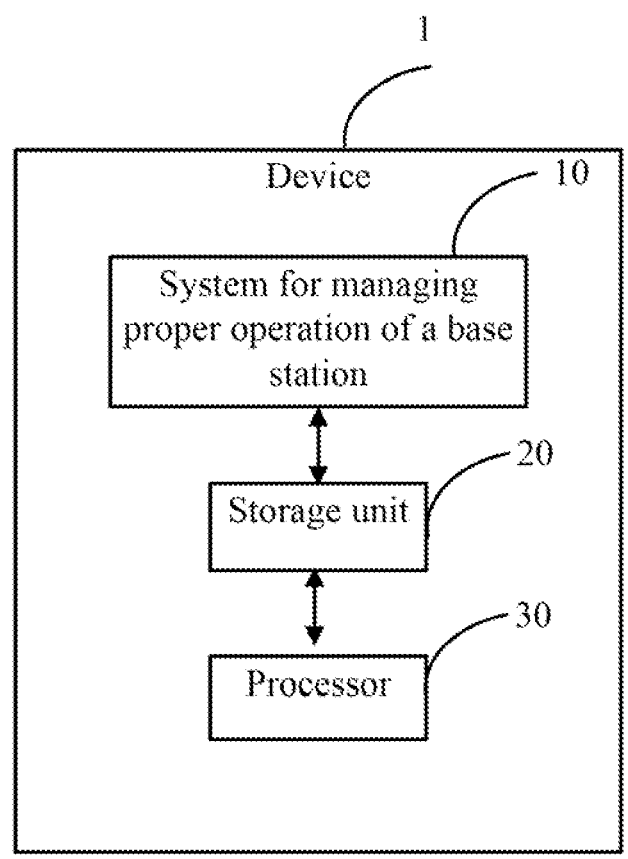
FIG. 1 is a block diagram of an exemplary embodiment of functional modules of a device for managing proper operation of a base station.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 is a block diagram of an exemplary embodiment of functional modules of a device for managing operations of a base station (device 1). The device 1 includes a system for managing proper operation of a base station 10, a storage unit 20, and a processor 30.

Wherein, the storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and so on. The processor 40 may be a central processing unit (CPU), a controller, a microcontroller, a microprocessor, or other data processing chip.

Figure 2:
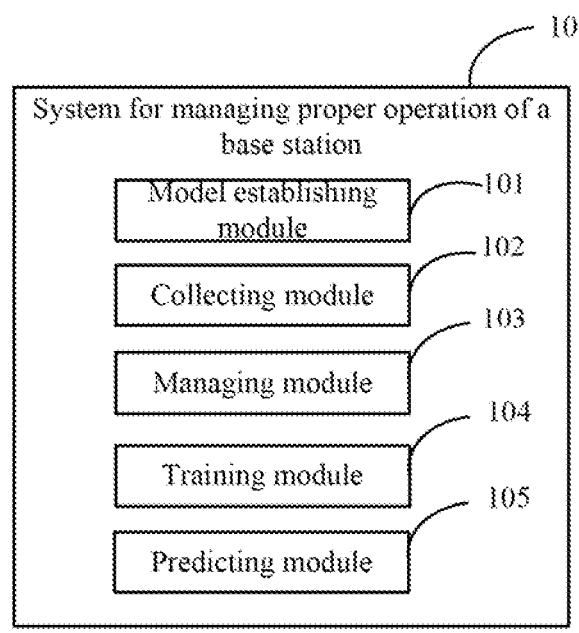
FIG. 2 is a block diagram of an exemplary embodiment of functional modules of a system for managing proper operation of a base station.

FIG. 2 illustrates a block diagram of an exemplary embodiment of functional modules of the system for managing proper operation of the base station 10.

The system for system for managing proper operation of a base station 10 includes a model establishing module 101, a collecting module 102, a managing module 103, a training module 104, and a predicting module 105. The modules are configured to be executed by one or more processors (in the embodiment, one processor 30) to realize the method. The modules referred to are computer program segments that perform a specific instruction. The storage unit 20 is used to store program code and other data of the health management system for base station operation 10. The processor 30 is used to execute the program code stored in the storage unit 20.

The model establishing module 101 establishes a base station data model to realize remote monitoring integration of different base stations.

In the embodiment, the model establishing module 101 further classifies base stations according to type of base station; also category for monitoring the base station; key performance indicator (KPI) which are applicable and the alarm events of the base stations in the corresponding monitoring category. A collecting point is set, and a calculation formula of the KPI is made according to the collecting point.

In the embodiment, different base stations will upload KPI and alarm events in different ways, and the data models used are different. In order to avoid difference of different cells from interfering in the analysis, the model establishing module 101 further classifies base stations according to type of base stations and cell groups covered by the base stations. There are many faults and parameters monitored by the base station, ranging from dozens to more than a thousand. In the embodiment, follow-up multi-dimensional analysis is performed by classifying the monitoring categories, such as Radio Resource Control (RRC), Evolved Radio Access Bearer (E-RAB), Closed user group (CSG), S1 Application Protocol (S1-AP), Mobility Management Entity (MME), central processing unit (CPU), and so on. The monitoring category can also be divided into multiple levels, such as establishing RRC ESTAB, RRC REESTAB, etc. under RRC. Data collection points are added for alarm events and KPI, IDs configured, data type, unit, description, and other parameters for the collecting points. A KPI is often a comprehensive result of calculations applied at multiple collecting points. In the embodiment, the setting calculation formula for the KPI includes: establishing a linear relationship between the KPI and the collecting point, or establishing a one-to-one mapping relationship between the KPI and the collecting point.

The collecting module 102 collects the KPI and alarm event uploaded by the base stations through the base station data model.

In the embodiment, the collecting module 102 further receives a file uploaded by the base stations, and extracts content of the file; performs data filtering on the extracted content of the file according to the base station data model; and calculates KPI and the alarm event from a filtered data through the base station model.

The collecting module 102 uses tr069 and Net-Config to configure and connect with the base stations. The base station uploads files through a transmission protocol (such as a File Transfer Protocol (FTP), Hypertext Transfer Protocol (HTTP) and so on). After receiving the file uploaded by the base station, the collecting module 102 extracts the content of the file, and performs data filtering on the extracted file content according to the base station model corresponding to the base station. Excess data is deleted, and KPI and alarm event are calculated by the filtered data through the base station model, and the data in the database is stored at the same time.

The model establishing module 101 further cell groups covered by the base stations, and builds a health management model for base station operation based on cell grouping, KPI, and the alarm event.

The managing module 103 receives KPIs and the alarm events uploaded by the base stations, and updates a health level of each base station according to the base station health management model.

In the embodiment, the health levels of the base stations comprise health, sub-health, failure, and damage. The managing module 103 compares the received KPI with a preset threshold to obtain a first comparison; determines whether the alarm event is received, and when the alarm event is received, determines level of the alarm event, and obtains a second comparison; and determines the health level of the base stations according to the first and second comparisons. For example, if all KPI are normal and there is no alarm event, the health level is good health; if there are abnormal KPI and the ratio is less than 5%, or a general alarm event occurs, the health level is sub-health; if the abnormal ratio of KPI exceeds 5%, or if one serious alarm event occurs, the health level is a fail; if there is no KPI, or the abnormal proportion of KPI indicators exceeds 10%, or if multiple serious alarm events occur, the health level is damaged. In the embodiment, the preset threshold is set by the developer according to actual needs, and is not limited to examples.

The training module 104 performs offline model training on the base station health management model.

In the embodiment, the configuration module 104 selects part of KPI as a prediction target, and performing model dividing according to a top KPI classification, and each category has a model, and the first two indicators in the classification are combined into a two-dimensional prediction target (x, y); normalizes all KPI in the category to construct a vector group (a, b, c, . . . n), taking the vector group of the time vector t−1 to construct a training set, and the time vector t (x, y) as a result to construct training data; divides the training data into the training set and a validation set using a preset ratio (such as 7:3); trains model in round-robin fashion through a preset back propagation (BP) neural network algorithm, a light gradient boosting machine (LightGBM) gradient algorithm, a linear regression algorithm, taking the model with a highest prediction accuracy rate as a prediction model of the KPI category; and updates the prediction model regularly. For example, the total amount of data in the training set and the validation set can be limited to 1000 recent records to avoid excessive training time. In a preferred embodiment, automatic finite element feature filtering is used, and each model only takes the top five KPIs with correlation coefficients. The KPIs are used as the optimized training set to reduce the training load of the model.

The predicting module 105 realizes online prediction of KPI and alarm event according to the trained base station health management model.

Specifically, the predicting module 105 filters the KPI of each classification group, takes out the model to input and normalize a related target KPI to construct a feature data set; imports feature data into a real-time analysis model; performs threshold determination on a predicted KPI. If the KPI exceeds a preset threshold, the KPI is abnormal; queries an alarm knowledge base to retrieve whether there is a related alarm event if there is an abnormal KPI, and performs an alarm warning if there is the related alarm event; calculates health prediction results based on KPI and the alarm event, generates multi-dimensional analysis reports of KPI prediction results, and provides the alarm warning.

In the embodiment, the system for managing proper operation of the base station is able to realize remote monitoring and integration of different base stations through base station model management, use health level management to evaluate stability and performance status for base station operation, build base station health management model through cell grouping, KPI and alarm event, so that users can intuitively perceive current operating status of the base station, by predicting KPI, and correlating the predicted abnormalities of KPI with alarm event, predict the alarm event, through multi-dimensional analysis report of prediction results of the KPI and early warning of alarm event, enable discovery of potential operation problems of base stations in advance, adjust the base station configuration in advance, or troubleshoot and repair.

Figure 3:
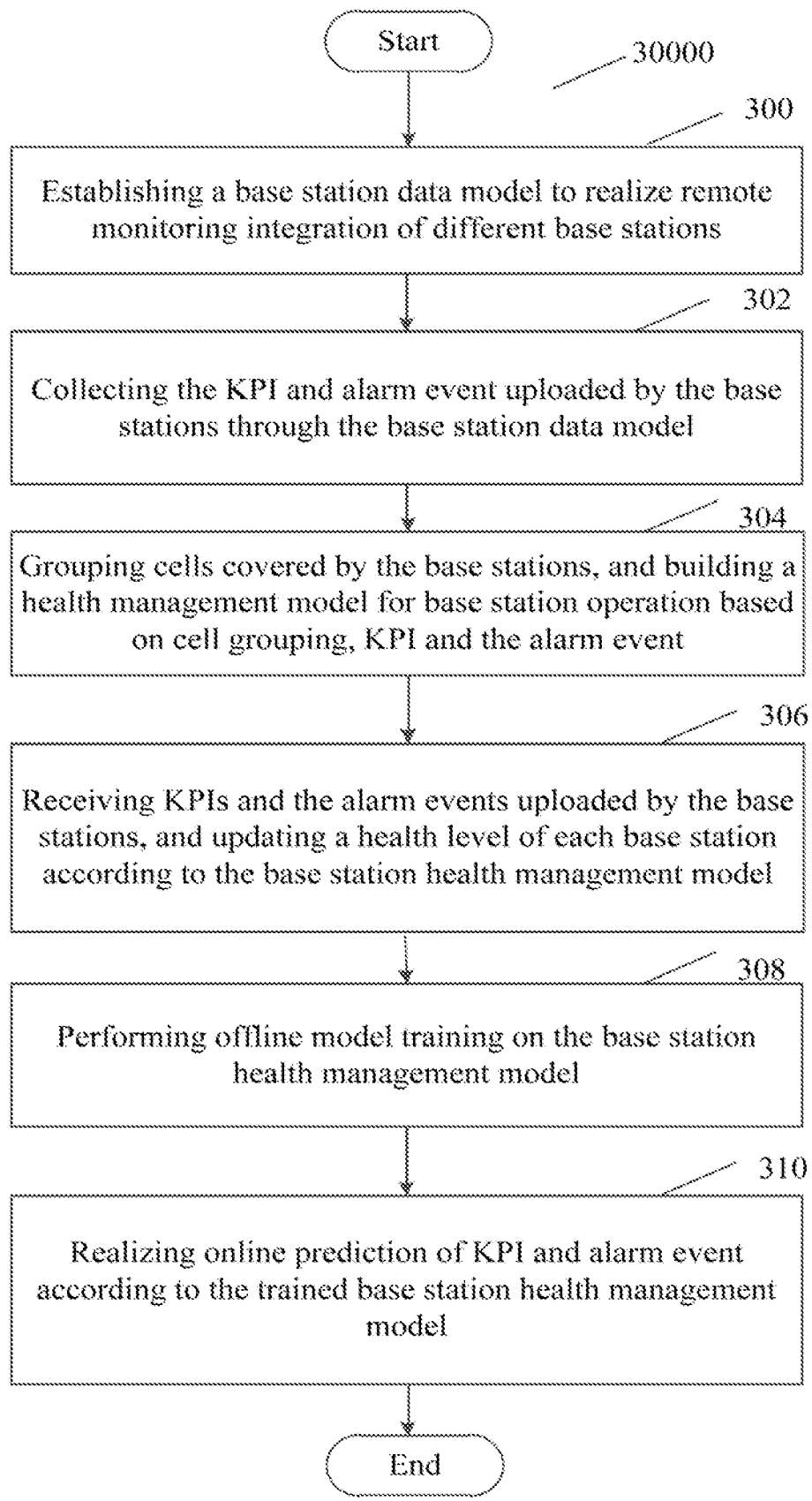
FIG. 3 is a flowchart of a method for managing proper operation of a base in one embodiment.

Referring to FIG. 3, a flowchart of a method system for managing proper operation of a base station (method 30000) in accordance with one embodiment is applied in the device 1, and the function modules 101-105, as FIG. 2 illustrates, are executed by the processor 30. Each block shown in FIG. 3 represents one or more processes, methods, or subroutines, carried out in the exemplary method 30000. Additionally, the illustrated order of blocks is by example only and the order of the blocks can be changed. The method 30000 can begin at block 300.

At block 300, establishing a base station data model to realize remote monitoring integration of different base stations.

Figure 4:
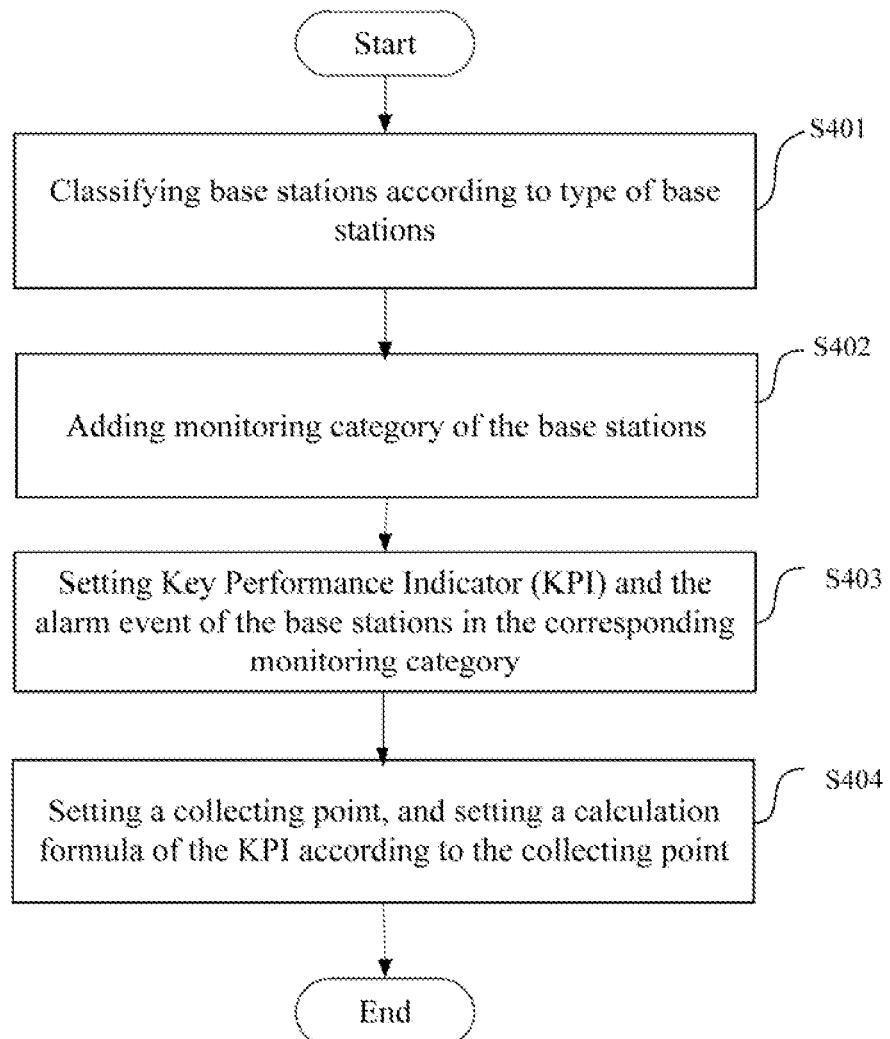
FIG. 4 is a flowchart of sub-steps of step S300 in an embodiment of the present disclosure.

Specifically, as shown in FIG. 4, the block 300 includes the steps: step S401, classifying base stations according to type of base stations; step S402, adding monitoring category of the base stations; step S403, setting key performance indicator (KPI) and the alarm event of the base stations in the corresponding monitoring category; step S404, setting a collecting point, and setting a calculation formula of the KPI according to the collecting point.

In the embodiment, different base stations will upload KPI and alarm event in different ways, and the data models used are different. In order to avoid difference of different cells from interfering with the analysis, the device 1 further classifies base stations according to type of base stations and cell groups covered by the base stations. There are many faults and parameters monitored by the base station, ranging from dozens to more than a thousand. In the embodiment, follow-up multi-dimensional analysis is performed by classifying the monitoring categories, such as Radio Resource Control (RRC), Evolved Radio Access Bearer (E-RAB), closed user group (CSG), S1 Application Protocol (S1-AP), Mobility Management Entity (MME), central processing unit (CPU) and so on. The monitoring category can also be divided into multiple levels, such as establishing RRC ESTAB, RRC REESTAB, etc. under RRC. Data collection points are added for alarm event and KPI, configure ID, data type, unit, description and other parameters for the collecting points. A KPI is often a comprehensive result of calculating at multiple collecting points. In the embodiment, the setting calculation formula for the KPI includes: establishing a linear relationship between the KPI and the collecting point, or establishing a one-to-one mapping relationship between the KPI and the collecting point.

At block 302, collecting the KPI and alarm event uploaded by the base stations through the base station data model.

Figure 5:
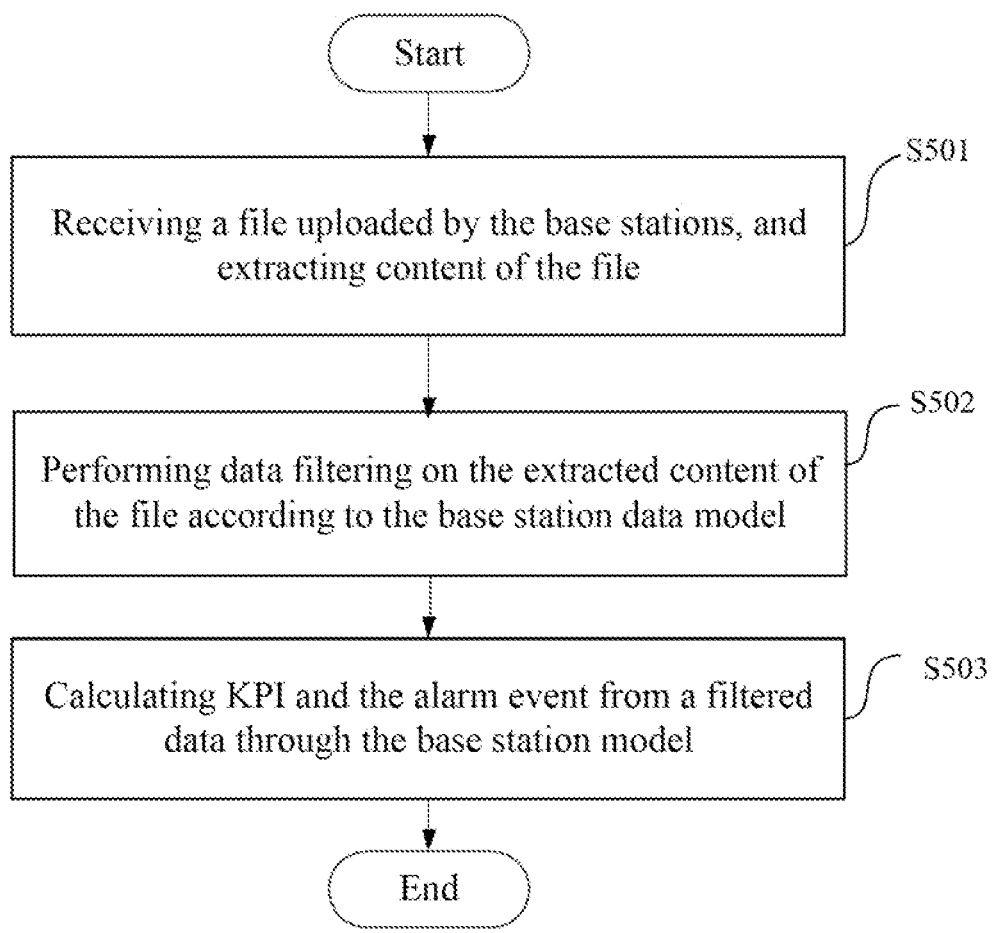
FIG. 5 is a flowchart of sub-steps of step S302 in an embodiment of the present disclosure.

In the embodiment, as shown in FIG. 5, the block 302 includes the steps: step S501, receiving a file uploaded by the base stations, and extracting content of the file; step S502, performing data filtering on the extracted content of the file according to the base station data model; step S503, calculating KPI and the alarm event from a filtered data through the base station model.

The device 1 uses tr069 and Net-Config to configure and connect with the base stations. The base station uploads files through a transmission protocol (such as a File Transfer Protocol (FTP), Hypertext Transfer Protocol (HTTP) and so on). After receiving the file uploaded by the base station, the device 1 extracts the content of the file, and performs data filtering on the extracted file content according to the base station model corresponding to the base station, deletes excess data, and calculates KPI and alarm event by the filtered data through the base station model, and stores the data in the database at the same time.

At block 304, grouping cells covered by the base stations, and building a health management model for base station operation based on cell grouping, KPI and the alarm event.

At block 306, receiving KPIs and the alarm events uploaded by the base stations, and updating a health level of each base station according to the base station health management model.

In the embodiment, the health level of the base stations comprises good health, sub-health, fail and damaged. The device 1 includes the received KPI with a preset threshold to obtain a first comparison; determines whether the alarm event is received, and when the alarm event is received, determines level of the alarm event, and obtains a second comparison; determines the health level of the base stations according to the first comparison and the second comparison. For example, if all KPI are normal and there is no alarm event, the health level is good health; if there are abnormal KPI and the ratio is less than 5%, or a general alarm event occurs, the health level is sub-health; if the abnormal ratio of KPI exceeds 5%, or if one serious alarm event occurs, the health level is a fail; if there is no KPI, or the abnormal proportion of KPI indicators exceeds 10%, or if multiple serious alarm events occur, the health level is damaged, that is, the base station is damaged. In the embodiment, the preset threshold is set by the developer according to actual needs, and is not limited to examples.

At block 308, performing offline model training on the base station health management model.

In the embodiment, the device 1 selects part of KPI as a prediction target, and performing model dividing according to a top KPI classification, and each category has a model, and the first two indicators in the classification are combined into a two-dimensional prediction target (x, y); normalizes all KPI in the category to construct a vector group (a, b, c, . . . n), taking the vector group of the time vector t−1 to construct a training set, and the time vector t (x, y) as a result to construct training data; divides the training data into the training set and a validation set using a preset ratio (such as 7:3); round-robin training of model through a preset Back Propagation (BP) neural network algorithm, a Light Gradient Boosting Machine (LightGBM) gradient algorithm, a linear regression algorithm, taking the model with a highest prediction accuracy rate as a prediction model of the KPI category; and updating the prediction model regularly. For example, the total amount of data in the training set and the validation set can be limited to 1000 recent records to avoid excessive training time. In a preferred embodiment, automatic finite element feature filtering is used, and each model only takes the top five KPIs with correlation coefficients. The KPIs are used as the optimized training set to reduce the training load of the model.

At block 310, realizing online prediction of KPI and alarm event according to the trained base station health management model.

Specifically, the device 1 filters the KPI of each classification group, takes out the model to input and normalize a related target KPI to construct a feature data set; imports feature data into a real-time analysis model; performs threshold determination on a predicted KPI, if the KPI exceeds a preset threshold, the KPI is abnormal; queries an alarm knowledge base to retrieve any related alarm event if there is an abnormal KPI, and performs an alarm warning if there is the related alarm event; calculates health prediction results based on KPI and the alarm event, generates multi-dimensional analysis reports of KPI prediction results, and provides the alarm warning.

In the disclosed method, the health management method for base station operation is able to realize remote monitoring and integration of different base stations through base station model management, use health level management to evaluate stability and performance status for base station operation, build base station health management model through cell grouping, KPI and alarm event, so that users can intuitively perceive current operating status of the base station, by predicting KPI, and correlating the predicted abnormalities of KPI with alarm event, predict the alarm event, through multi-dimensional analysis report of prediction results of the KPI and early warning of alarm event, enable discovery of potential operation problems of base stations in advance, adjust the base station configuration in advance, or troubleshoot and repair.

The embodiments shown and described above are only examples. Many details are often found in the relevant art and such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for managing proper operation of a base station, the method comprising:
   establishing a base station data model to realize remote monitoring integration of different base stations;
   collecting a key performance indicator (KPI) and an alarm event uploaded by the base stations through the base station data model;
   grouping cells covered by the base stations, and building a health management model for base station operation based on cell grouping, KPI and the alarm event;
   receiving KPIs and alarm events uploaded by the base stations, and updating a health level of each base station according to the base station health management model;
   performing offline model training on the base station health management model; and
   realizing online prediction of KPIs and alarm events according to the trained base station health management model.

2. The method as claimed in claim 1, wherein the step of establishing a base station data model to realize remote monitoring integration of different base stations comprises:
   classifying the base stations according to types of the base stations;
   adding monitoring category of the base stations;
   setting the KPI and the alarm event of the base stations in the corresponding monitoring category; and
   setting a collecting point, and setting a calculation formula of the KPI according to the collecting point.

3. The method as claimed in claim 1, wherein the step of collecting a key performance indicator (KPI) and an alarm event uploaded by various base stations through the base station data model comprises:
   receiving a file uploaded by the base stations, and extracting content of the file;
   performing data filtering on the extracted content of the file according to the base station data model;
   calculating KPI and the alarm event from a filtered data through the base station model.

4. The method as claimed in claim 1, wherein the step of receiving KPIs and alarm events uploaded by the base stations, and updating a health level of each base station according to the base station health management model comprises:
   comparing the received KPI with a preset threshold to obtain a first comparison result;
   determining whether the alarm event is received, and when the alarm event is received, determining level of the alarm event, and obtaining a second comparison result;
   determining the health level of each base station according to the first comparison result and the second comparison result.

5. The method as claimed in claim 1, wherein the health level of the base stations comprises health, sub-health, failure and damaged.

6. The method as claimed in claim 1, wherein the step of performing offline model training on the base station health management model comprises:
   selecting part of KPI as a prediction target, and performing model dividing according to a top KPI classification, and each category has a model, and the first two indicators in the classification are combined into a two-dimensional prediction target (x, y);
   normalizing all KPI in the category to construct a vector group (a, b, c, . . . n), taking the vector group of the time vector t−1 to construct a training set, and the time vector t (x, y) as a result to construct training data;
   dividing the training data into the training set and a validation set using a preset ratio;
   round-robin training model through a preset back propagation (BP) neural network algorithm, a light gradient boosting machine (LightGBM) gradient algorithm, a linear regression algorithm, taking the model with a highest prediction accuracy rate as a prediction model of the KPI category;
   updating the prediction model.

7. The method as claimed in claim 1, wherein the step of realizing online prediction of KPI and alarm event according to the trained base station health management model comprises:
   filtering the KPI of each classification group, taking out the model to input and normalize a related target KPI to construct a feature data set;
   importing feature data into a real-time analysis model;
   performing threshold determination on a predicted KPI, if the KPI exceeds a preset threshold, the KPI is abnormal;
   querying an alarm knowledge base to retrieve whether there is a related alarm event when there is an abnormal KPI;
   performing an alarm warning when there is the related alarm event;
   calculating health prediction results based on KPIs and the alarm events, generating multi-dimensional analysis reports of KPI prediction results, and providing the alarm warning.

8. A system for managing proper operation of a base station, the system comprising:
   at least one processor;
   a storage unit; and
   one or more programs that are stored in the storage unit and executed by the at least one processor, the one or more programs comprising instructions for:
   establishing a base station data model to realize remote monitoring integration of different base stations;
   collecting a key performance indicator (KPI) and an alarm event uploaded by the base stations through the base station data model;
   grouping cells covered by the base stations, and building a health management model for base station operation based on cell grouping, KPI and the alarm event;
   receiving KPIs and the alarm events uploaded by the base stations, and updating a health level of each base station according to the base station health management model;

performing offline model training on the base station health management model; and realizing online prediction of KPIs and alarm events according to the trained base station health management model.

9. The system as claimed in claim 8, wherein the step of establishing a base station data model to realize remote monitoring integration of different base stations comprises:

classifying the base stations according to types of the base stations;

adding monitoring category of the base stations;

setting the KPI and the alarm event of the base stations in the corresponding monitoring category; and setting a collecting point, and setting a calculation formula of the KPI according to the collecting point.

10. The method as claimed in claim 8, wherein the step of collecting a key performance indicator (KPI) and an alarm event uploaded by various base stations through the base station data model comprises:

receiving a file uploaded by the base stations, and extracting content of the file;

performing data filtering on the extracted content of the file according to the base station data model;

calculating KPI and the alarm event from a filtered data through the base station model.

11. The method as claimed in claim 8, wherein the step of receiving KPIs and the alarm events uploaded by the base stations, and updating a health level of each base station according to the base station health management model comprises:

comparing the received KPI with a preset threshold to obtain a first comparison result;

determining whether the alarm event is received, and when the alarm event is received, determining level of the alarm event, and obtaining a second comparison result;

determining the health level of each base station according to the first comparison result and the second comparison result.

12. The method as claimed in claim 8, wherein the health level of the base stations comprises health, sub-health, failure and damaged.

13. The method as claimed in claim 8, wherein the step of performing offline model training on the base station health management model comprises:

selecting part of KPI as a prediction target, and performing model dividing according to a top KPI classification, and each category has a model, and the first two indicators in the classification are combined into a two-dimensional prediction target (x, y);

normalizing all KPI in the category to construct a vector group (a, b, c, . . . n), taking the vector group of the time vector t−1 to construct a training set, and the time vector t (x, y) as a result to construct training data;

dividing the training data into the training set and a validation set using a preset ratio;

round-robin training model through a preset back propagation (BP) neural network algorithm, a light gradient boosting machine (LightGBM) gradient algorithm, a linear regression algorithm, taking the model with a highest prediction accuracy rate as a prediction model of the KPI category;

updating the prediction model.

14. The method as claimed in claim 8, wherein the step of realizing online prediction of KPI and alarm event according to the trained base station health management model comprises:

filtering the KPI of each classification group, taking out the model to input and normalize a related target KPI to construct a feature data set;

importing feature data into a real-time analysis model;

performing threshold determination on a predicted KPI, if the KPI exceeds a preset threshold, the KPI is abnormal;

querying an alarm knowledge base to retrieve whether there is a related alarm event when there is an abnormal KPI;

performing an alarm warning, there is the related alarm event;

calculating health prediction results based on KPI and the alarm event, generating multi-dimensional analysis reports of KPI prediction results, and providing the alarm warning.

15. A non-transitory computer-readable storage medium in which computer programs are stored, and the computer programs can be executed by at least one processor, to enforce following steps:

establishing a base station data model to realize remote monitoring integration of different base stations;

collecting a key performance indicator (KPI) and an alarm event uploaded by the base stations through the base station data model;

grouping cells covered by the base stations, and building a health management model for base station operation based on cell grouping, KPI and the alarm event; and receiving KPIs and the alarm events uploaded by the base stations, and updating a health level of each base station according to the base station health management model;

performing offline model training on the base station health management model; and realizing online prediction of KPIs and alarm events according to the trained base station health management model.

* * * * *